United States Patent [19]

Härtel

[11] Patent Number: 4,750,719
[45] Date of Patent: Jun. 14, 1988

[54] TWO-CHAMBER ENGINE MOUNT

[75] Inventor: Volker Härtel, Germering, Fed. Rep. of Germany

[73] Assignee: Metzeler Kautschuk GmbH, Munich, Fed. Rep. of Germany

[21] Appl. No.: 70,962

[22] Filed: Jul. 8, 1987

[30] Foreign Application Priority Data

Jul. 18, 1986 [DE] Fed. Rep. of Germany ....... 3624361

[51] Int. Cl.⁴ ...................... F16M 5/00; F16M 13/00; B62D 21/00
[52] U.S. Cl. .................................... 267/219; 180/312; 248/562; 248/636; 267/140.1
[58] Field of Search ...................... 267/35, 140.1, 152, 267/153, 219, 217, 256, 257, 258, 292; 188/298; 180/300, 312; 123/192 R, 195 A; 248/562, 636, 659

[56] References Cited

U.S. PATENT DOCUMENTS 4,535,976 8/1985 Dan et al. ........................... 267/219
4,666,016 5/1987 Abe et al. ......................... 248/636 X

Primary Examiner—Andres Kashnikow
Assistant Examiner—Robert J. Oberleitner
Attorney, Agent, or Firm—Herbert L. Lerner; Laurence A. Greenberg

[57] ABSTRACT

A two-chamber engine mount with hydraulic damping includes a cup-shaped housing having a cylindrical wall with an inner surface and a given height, an open upper end and a bottom. A frustoconical rubber-elastic bearing spring with inner and outer surfaces, a base region and substantially the given height is disposed in the housing. An engine mount plate is supported on the bearing spring. A flexible-volume, rubber-elastic diaphragm closes off the open upper end of the cylindrical wall. The inner surface of the support spring and the bottom of the housing defines a working chamber and the outer surface of the bearing spring, the inner surface of the cylindrical wall and the diaphragm defines a compensating chamber. The base region of the bearing spring has a transfer port formed therein interconnecting the working chamber and the compensating chamber.

9 Claims, 2 Drawing Sheets

TWO-CHAMBER ENGINE MOUNT

The invention relates to a two-chamber engine mount with hydraulic damping, especially for motor vehicles, having a working chamber surrounded by a frustoconical rubber elastic bearing spring supporting an engine mount plate, and a compensating chamber located outside the bearing spring and sealed off by a rubber-elastic diaphragm, the working chamber and the compensating chamber communicating with one another through a transfer port.

Conventional two-chamber engine mounts, such as those described by way of example in German Patent DE-PS No. 34 21 119, corresponding to U.S. Pat. No. 4,721,288, are typically formed of a frustoconical upper part, an intermediate plate that includes the generally annular transfer port and a central decoupling diaphragm, as well as a compensation chamber that is defined by a flexible-volume diaphragm. The transfer port disposed in the intermediate plate can assume a maximum length of approximately three times the inside diameter of the intermediate plate, unless it is formed in a spiral fashion. The structural height required for the intermediate plate and the compensation chamber together is generally approximately 30 mm.

Structures that require a greater transfer port length for reasons having to do with vibration, typically result in greater structural heights, or they correspondingly shrink the available space for a decoupling diaphragm, because they require a spiral formation of the transfer port in the intermediate plate.

In this connection, engine mounts of the generic type described above are known from German Patent DE-PS No. 29 06 282, in which the compensating chamber is not disposed below the bearing spring but instead annularly surrounds it. This means that the compensating chamber is surrounded by the outer wall of the frustoconical bearing spring and by a soft, bellows-like rubber diaphragm located on the outside. A substantial disadvantage of this construction is the lack of means for protecting against the escape of fluid when when the motor is turned off, because the rubber diaphragm which has a very large surface area is easily damaged and can be protected only by an additional cup-shaped cap. A further disadvantage of this mount is in the disposition of the transfer port and the end flange of the bearing spring, as a result of which only a very short length of the transfer port is possible, so that a viscous damping of the mount can be attained, but not the additional inertial effect of the mass of fluid enclosed and vibrating in the transfer port that is in modern constructions.

It is accordingly an object of the invention to provide a hydraulically damped two-chamber engine mount, which overcomes the hereinafore-mentioned disadvantages of the heretofore-known devices of this general type, which is distinguished by a very low structural height, a simple construction and few individual parts, and which furthermore allows very long transfer ports to be used and is safe from fluid escape.

With the foregoing and other objects in view there is provided, in accordance with the invention, a two-chamber engine mount with hydraulic damping, comprising a cup-shaped housing having a cylindrical wall with an inner surface and a given height, an open upper end and a bottom; a frusto-conical rubber-elastic bearing spring with inner and outer surfaces, a base region and substantially the given height being disposed in the housing; an engine mount plate supported on the bearing spring; and a flexible-volume, rubber-elastic diaphragm closing off the open upper end of the cylindrical wall; the inner surface of the support spring and the bottom of the housing defining a working chamber; the outer surface of the bearing spring, the inner surface of the cylindrical wall and the diaphragm defining a compensating chamber; and the base region of the bearing spring having a transfer port formed therein interconnecting the working chamber and the compensating chamber.

The compensating chamber is thus located at the same level as the working chamber and surrounds it annularly. As a result, a very low structural height is attained, and moreover the mount is largely protected against the escape of the hydraulic fluid through the surrounding metal housing.

In accordance with another feature of the invention, the frustoconical bearing spring has a given maximum outside diameter and the cup-shaped housing has an inside diameter equal to the given diameter.

In accordance with a further feature of the invention, the housing has an upper edge, the engine mount plate has an outer periphery, and the diaphragm is in the form of an annular disk fluid-tightly attached to the upper edge of the housing and to the outer periphery of the engine mount plate.

For the sake of generous dimensioning of the transfer port, in accordance with an added feature of the invention, the housing has an inner corner, and there is provided a substantially concavely curved metal ring vulcanized onto the base region of the bearing spring, the metal ring and the inner corner of the housing defining the transfer port, and the metal ring having an inner opening communicating with the working chamber and an outer opening communicating with the compensating chamber.

In accordance with an additional feature of the invention, the transfer port has a port length for a fluid flow and a curved remaining segment through which there is no fluid flow, the two openings being mutually offset by an angle defining the port length, and there is provided an insert closing off the remaining port segment.

For the sake of additional retention of the bearing spring, in accordance with yet another feature of the invention, the cylindrical wall has a circumferential bead securing the bearing spring above the base region.

As protection for the face-end diaphragm, in accordance with yet a further feature of the invention, the housing has an upper edge, and there is provided a rigid cap affixed on the engine mount plate, embracing the upper edge with play and covering the diaphragm.

In accordance with yet an added feature of the invention, the bearing spring has a circular-disk-like partial reduction in the thickness thereof forming an integral decoupling diaphragm. In this way, it is also possible to form an integral decoupling diaphragm besides a conventional disposition of a decoupling diaphragm on the underside of the engine mount plate.

In accordance with a concomitant feature of the invention, the bottom of the housing is in the form of a bottom plate separate from the cylindrical wall, the base region of the bearing spring has a recess formed therein defining an upper part of the transfer port, the bearing spring is vulcanized into the cylindrical wall, and the bottom plate is fluid-tightly mounted to the cylindrical wall after the bearing spring is vulcanized into the cylindrical wall.

Other features which are considered as characteristic for the invention are set forth in the appended claims.

Although the invention is illustrated and described herein as embodied in a two-chamber engine mount, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
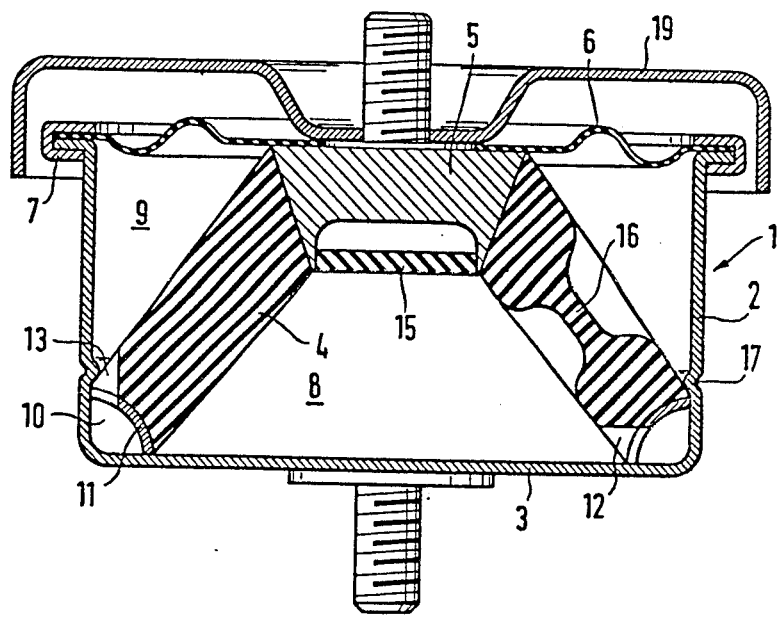
FIG. 1 is a diagrammatic, longitudinal-sectional view of an engine mount taken along the line I—I of FIG. 2, in the direction of the arrows.

Referring now to the figures of the drawings in detail and first, particularly, to FIG. 1 thereof, there is seen an engine mount having a cup-shaped housing 1 which is open at the top and has a cylindrical wall portion 2 and a flat bottom plate 3. The engine mount has an upper portion which is frustoconical as in a conventional engine mount and is inserted into the housing 1. The engine mount includes a conical bearing spring 4 made of a rubber-elastic material and an engine mount plate 5 vulcanized in place at the end surface thereof. The inside diameter of the housing 1 is equivalent to the largest outside diameter of the bearing spring 4. The height of the cylindrical housing portion 2 is equivalent to the height of the bearing spring 4 under a static load. At the end surface of the engine mount, a free annular space between the engine mount plate 5 and the housing wall 2 is closed by an annular rubber-elastic, flexible-volume or volumetrically elastic diaphragm 6, which is attached to the upper flange 7 of the housing wall 2 and to the engine mount plate 5 in a fluid-tight manner.

Accordingly, this construction results in a working chamber 8 defined and surrounded by the bearing spring 4, the engine mount plate 5 and the housing bottom plate 3, as well as a compensation chamber 9 at the same level defined and surrounded by the outer surface of the bearing spring 4, the cylindrical housing wall 2 and the diaphragm 6. The hydraulic communication between the two chambers 8 and 9 is established by means of a transfer port 10 at the base or foot of the bearing spring 4. A concavely curved metal ring 11 is suitably vulcanized in place at the foot of the bearing spring 4. The transfer port 10 is defined by the metal ring together with the corresponding corner of the housing formed by the bottom plate 3 and the wall 2. The transfer port 10 communicates with the working chamber 8 through an inwardly directed opening 12 in the metal ring 11 and it communicates with the compensation chamber 9 through an upwardly directed opening 13 in the metal ring 11.

Figure 2:
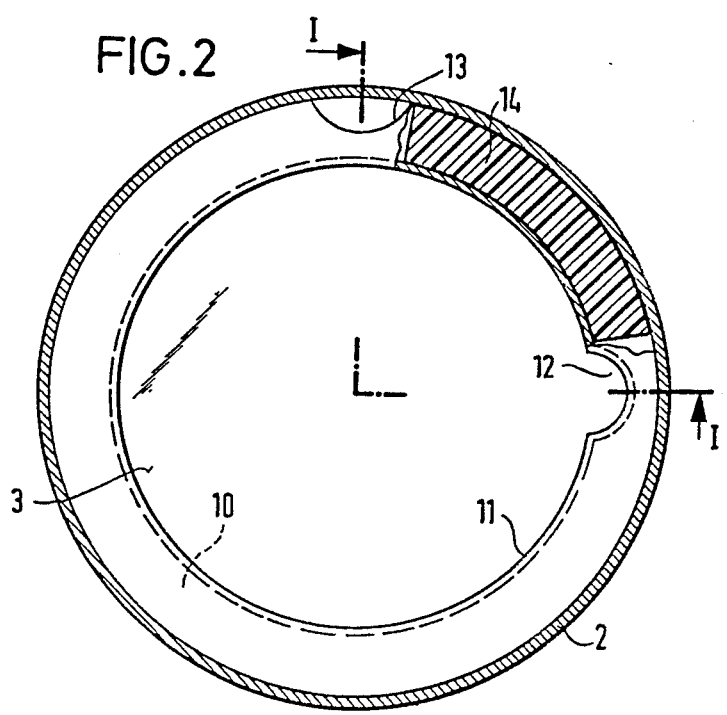
FIG. 2 is a partly broken-away, cross-sectional view of the engine mount above the transfer port, without the rubber-elastic bearing spring.

As shown particularly in FIG. 2, which is a view onto the metal ring 11 with the bearing spring 4 omitted from the drawing, the corresponding openings 12 and 13 in the metal ring 11 are mutually offset by approximately 270° in the illustrated embodiment, resulting in a transfer port having ¾ of the length of the circumference of the housing. However, the length of the port can be varied arbitrarily and adjusted within wide limits by a corresponding disposition and association of the openings 12 and 13. The region of the transfer port located between the two openings 12 and 13 through which there is no flow, is suitably closed with a corresponding stopper or a plastic compound 14, as indicated in the broken-away portion of FIG. 2.

This disposition of the transfer port 10 on the outer contour of the housing enables very long ports with a comparably large cross section to be provided, so that even highly viscous fluids can thus be used as a working fluid.

Any decoupling elements required can be placed into the engine mount plate 5 in the conventional manner in the form of a diaphragm 15. However, it is also possible to make one segment of the bearing spring 4 partially thinner, so that a corresponding circular-disk-like reduction of the wall thickness results in an integrated decoupling diaphragm 16.

In order to fix the bearing spring 4 in place, the housing wall 2 can be provided with a bead 17 completely encompassing of extending over portions of the wall, the bead serving in a practical fashion as a stop for the metal ring 11 and for fixing the bearing spring 4 in its position. The engine mount can then be filled through non-illustrated bores in the housing 1 which are then closed by means of rivets or sealing stoppers.

In order to mechanically secure of the rubber diaphragm 6 closing off the compensation chamber 9, a rigid cap 19 can also be mounted on the engine mount plate 5. The cap suitably embraces the upper flange 7 of the housing 1 with play and thus acts at the same time as a stop to prevent excessive inward compression of the bearing spring 4.

Figure 3:
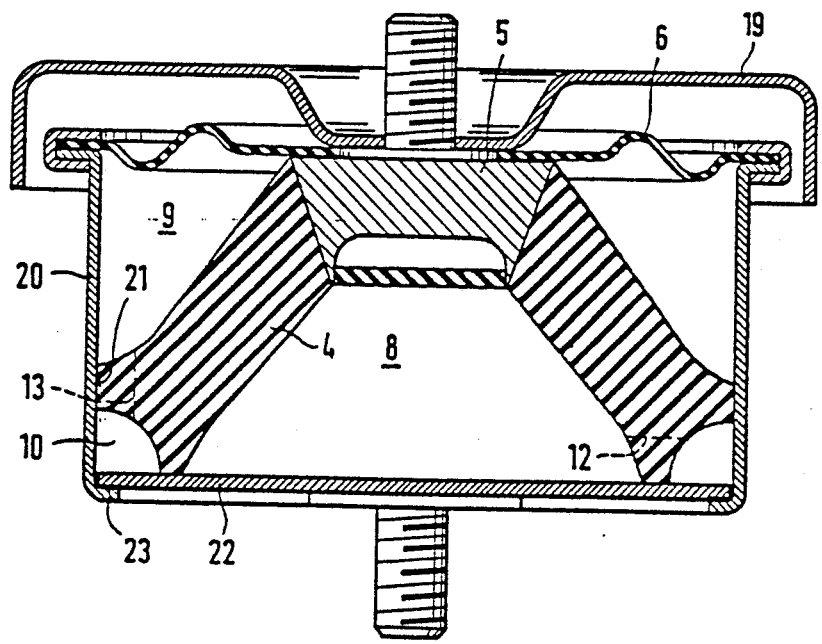
FIG. 3 is a longitudinal-sectional view similar to FIG. 1 showing a further embodiment of the engine mount, with a separately mounted bottom plate.

A further embodiment is shown in FIG. 3. In the FIG. 3 device, the bearing spring 4 is vulcanized into a housing wall 20, which is initially in the form of a cylindrical tube, so that a firmly adhering connection is brought about in a region 21. After mounting the remaining parts, a lower end surface 22, which is in the form of a separate part, is then provided with an encompassing rubber seal 23 and is attached to the cylindrical housing 20 in a fluid-tight manner. In this case, the transfer port 10 has no vulcanized-in metal ring, but instead is formed solely by means of a corresponding shaping of the base or foot of the bearing spring 4. The base or foot has corresponding openings 12 and 13 which communicate with the working chamber 8 and the compensating chamber 9.

The substantial advantage of an engine mount constructed in this way is its low structural height, which is due to the fact that the compensation chamber 9 annularly surrounds the working chamber 8. Furthermore, this construction is largely secured against the escape of fluid.

Additionally, only the flexible-volume or volumetrically elastic upper diaphragm 6 is exposed to the outer atmosphere. Since this diaphragm is not loaded statically and is only slightly loaded dynamically, it can be made from a heat, aging and ozone-resistant elastomer, such as EPDM. The bearing spring 4 is entirely surrounded by fluid and is thus protected from the effects of ozone and atmospheric oxygen, which can lead to premature aging of bearing springs, which are usually made of natural rubber. This makes it possible, for instance, to largely dispense with means for protecting against aging and ozone, which are primarily waxes that can negatively affect the dynamic properties of the rubber mixtures and the adhesion strength of rubber-to-metal connections. Furthermore, this embodiment makes it possible to provide a very long transfer port 10 having a relatively large cross section, despite the low structural height of the system, as a result of which very low tuning frequencies of the mount can be attained.

I claim:

1. Two-chamber engine mount with hydraulic damping, comprising a cup-shaped housing having a cylindrical wall with an inner surface and a given height, an open upper end and a bottom; a frustoconical rubber-elastic bearing spring with inner and outer surfaces, a base region, a height being substantially the same as said given height and said spring being disposed in said housing; an engine mount plate supported on said bearing spring; and a flexible-volume, rubber-elastic diaphragm closing off said open upper end of said cylindrical wall; said inner surface of said bearing spring and said bottom of said housing defining a working chamber; said outer surface of said bearing spring, said inner surface of said cylindrical wall and said diaphragm defining a compensating chamber; and said base region of said bearing spring having a transfer port formed therein interconnecting said working chamber and said compensating chamber.

2. Two-chamber engine mount according to claim 1, wherein said frustoconical bearing spring has a given maximum outside diameter and said cup-shaped housing has an inside diameter equal to said given diameter.

3. Two-chamber engine mount according to claim 1, wherein said housing has an upper edge, said engine mount plate has an outer periphery, and said diaphragm is in the form of an annular disk fluid-tightly attached to said upper edge of said housing and to said outer periphery of said engine mount plate.

4. Two-chamber engine mount according to claim 1, wherein said housing has an inner corner, and including a substantially concavely curved metal ring vulcanized onto said base region of said bearing spring, said metal ring and said inner corner of said housing defining said transfer port, and said metal ring having an inner opening communicating with said working chamber and an outer opening communicating with said compensating chamber.

5. Two-chamber engine mount according to claim 4, wherein said transfer port has a port length for a fluid flow and a curved remaining segment through which there is no fluid flow, said top openings being mutually offset by an angle defining said port length, and including an insert closing off said remaining port segment.

6. Two-chamber engine mount according to claim 1, wherein said cylindrical wall has a circumferential bead securing said bearing spring above said base region.

7. Two-chamber engine mount according to claim 1, wherein said housing has an upper edge, and including a rigid cap affixed on said engine mount plate, embracing said upper edge with play and covering said diaphragm.

8. Two-chamber engine mount according to claim 1, wherein said bearing spring has a circular-disk-like partial reduction in the thickness thereof forming an integral decoupling diaphragm.

9. Two-chamber engine mount according to claim 1, wherein said bottom of said housing is in the form of a bottom plate separate from said cylindrical wall, said base region of said bearing spring has a recess formed therein defining an upper part of said transfer port, said bearing spring is vulcanized into said cylindrical wall, and said bottom plate is fluid-tightly mounted to said cylindrical wall after said bearing spring is vulcanized into said cylindrical wall.

* * * * *